(12) United States Patent
Chen et al.

(10) Patent No.: US 10,232,452 B2
(45) Date of Patent: Mar. 19, 2019

(54) PIPE CUTTER

(71) Applicants: Tsan-Lung Chen, Taichung (TW);
Yuan-Te Chou, Taichung (TW); Yao Xu, Taichung (TW)

(72) Inventors: Tsan-Lung Chen, Taichung (TW);
Yuan-Te Chou, Taichung (TW); Yao Xu, Taichung (TW)

(73) Assignee: TOP GOAL ENTERPRISE LIMITED, Shanghai (CN)

( * ) Notice: Subject to any disclaimer, the term of this patent is extended or adjusted under 35 U.S.C. 154(b) by 77 days.

(21) Appl. No.: 15/681,341

(22) Filed: Aug. 19, 2017

(65) Prior Publication Data

US 2018/0326513 A1    Nov. 15, 2018

(30) Foreign Application Priority Data

May 10, 2017   (TW) .............................. 106115443 A

(51) Int. Cl.
*B23D 21/06*  (2006.01)
*B26D 3/16*   (2006.01)

(52) U.S. Cl.
CPC ............. *B23D 21/06* (2013.01); *B26D 3/169* (2013.01)

(58) Field of Classification Search
CPC ................................ B23D 21/06; B23D 3/169

USPC .......................... 30/92, 98, 99, 192, 244–252
See application file for complete search history.

(56) References Cited

U.S. PATENT DOCUMENTS

| | | | |
|---|---|---|---|
| 5,718,051 A * | 2/1998 | Huang | B23D 21/10 30/250 |
| 6,681,492 B1 * | 1/2004 | Huang | A01G 3/0251 30/192 |
| 9,616,508 B2 * | 4/2017 | Han | B23D 21/06 |
| 2008/0307657 A1 * | 12/2008 | Macsay | B23D 21/06 30/250 |
| 2010/0139100 A1 * | 6/2010 | Mortensen | B26B 17/02 30/92 |

* cited by examiner

*Primary Examiner* — Kenneth E Peterson
*Assistant Examiner* — Liang Dong

(57) ABSTRACT

A pipe cutter includes two bodies connected to each other to form a first room. Each body includes a passage. One of the two bodies has a second room. A torsion spring is located in the first room and includes a mounting member and a radial opening. A blade unit includes a pin, a blade, a movable member, a spring and an action member. When activating the action member to drive the movable member to compress the spring, the third contact portion and the second engaging portion of the movable member are disengaged from the groove and the first engaging portion of the pin, and the pin is not restricted and can be removed from the passage. The blade is not restricted by the pin and replaceable.

9 Claims, 16 Drawing Sheets

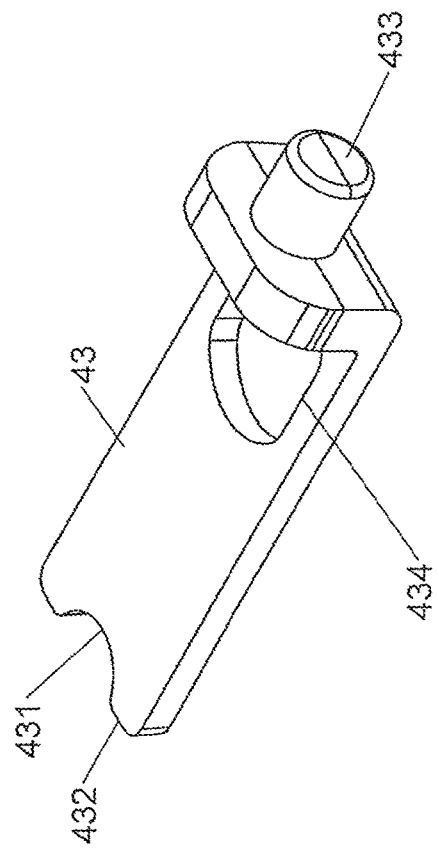
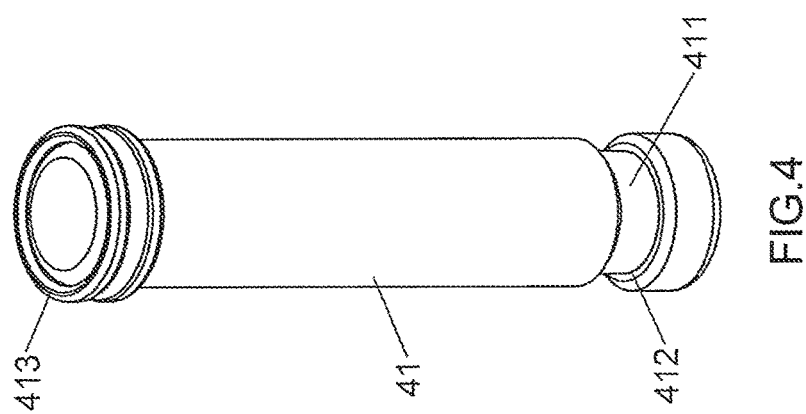

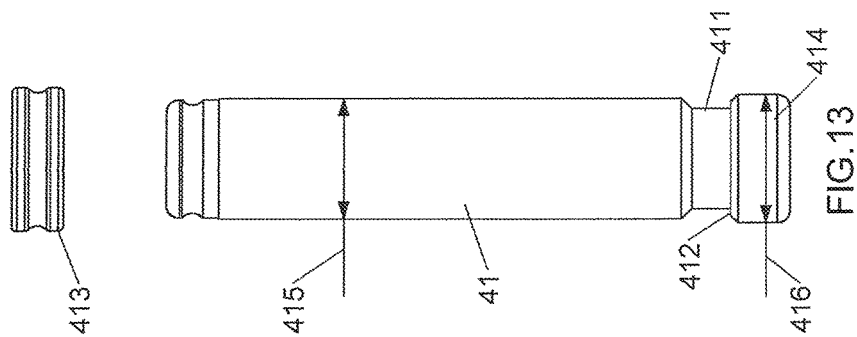

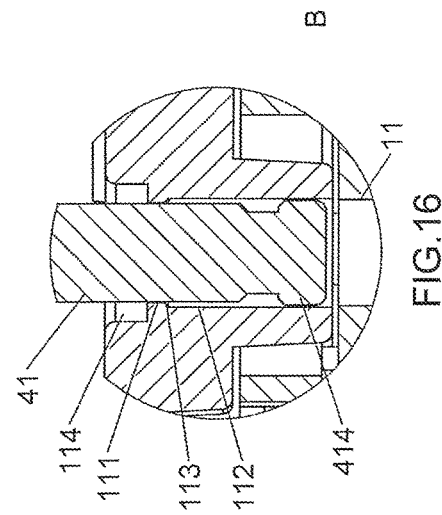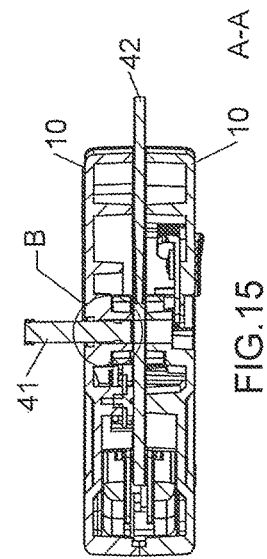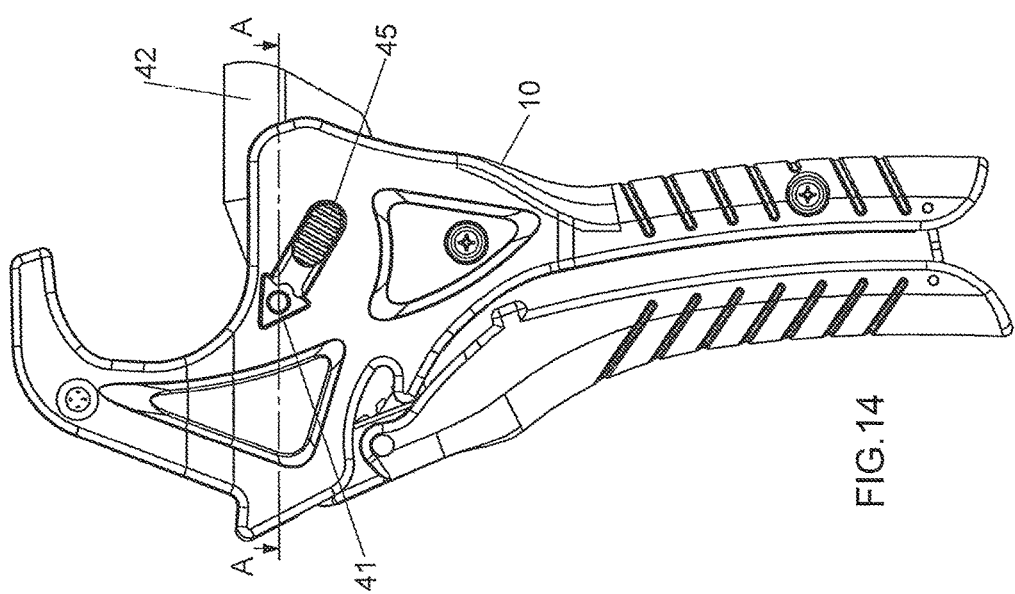

PIPE CUTTER

BACKGROUND OF THE INVENTION

1. Fields of the Invention

The present invention relates to a pipe cutter.

2. Descriptions of Related Art

The conventional ratchet cutting tool known to applicant is disclosed in U.S. Pat. No. 7,743,509, and comprises a first handle member defining a first hand grip portion on a first end and a workpiece cradle portion on the second opposite end. A pin member is selectively carried on the first handle member. A second handle member defines a second hand grip portion on the first end and is pivotably connected on the second end thereof with the first handle member. A blade sleeve member is carried on the first handle member and biased to a first position relative to the first handle member. A drive pawl is carried on the second handle member. A cutting blade includes a flat main body member defining an outer edge. A cutting edge is defined by a cutting portion of the outer edge. A plurality of spaced apart teeth is defined by a toothed portion of the outer edge. The plurality of teeth is configured to selectively engage the drive pawl of the cutting tool. A slot is defined by a slot portion of the outer edge. The slot portion is configured to selectively receive the blade sleeve member when the cutting blade is installed into the first handle member. An attachment portion on the main body member and is configured to selectively couple with the pin member for supporting relative rotational motion between the cutting blade and the cutting tool.

A ball detent on the second end of the pin, and the ball detent is connected to the second end of the pin along the axial direction of the pin, so that the grip head portion of the pin is located outside of the passageway when the grip head portion contacts the first elongate member. The ball detent includes a ball and a spring, when the user pushes the second end to move the pin, the ball of the ball detent presses the spring, and the pin is no longer restricted by the ball detent so that the pin can be moved. The blade pin opening of the cutting blade is not restricted by the pin, and can be replaced with another cutting blade. It is noted that the ball detent including the ball and the spring is not a safe design, if a force intentionally touches the second end, the ball of the ball detect may be submerged, and the pin may move to separate the pin from the cutting blade, such that the cutting blade can be separated from the elongate member. Besides, the spring in the ball detent may reach its fatigue point after frequent use to cause the ball to submerge into the ball detent more frequently.

The present invention intends to provide an improved pipe cutter to eliminate the shortcomings mentioned above.

SUMMARY OF THE INVENTION

The present invention relates to a pipe cutter and comprises two bodies connected to each other to form a first room. Each body includes a passage. One of the two bodies has a second room. A torsion spring is located in the first room and includes a mounting member and a radial opening. A blade unit includes a pin, a blade, a movable member, a spring and an action member. When activating the action member to drive the movable member to compress the spring, the third contact portion and the second engaging portion of the movable member are disengaged from the groove and the first engaging portion of the pin, and the pin is not restricted and can be removed from the passage. The blade is not restricted by the pin and replaceable.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 4 shows the pin of the pipe cutter of the present invention;

FIG. 5 shows the movable member of the pipe cutter of the present invention;

FIG. 13 shows the pin of the second embodiment of the pipe cutter of the present invention;

FIG. 14 is a plane view of the pipe cutter of the present invention;

FIG. 15 is a cross sectional view, taken along line 15-15 in FIG. 14;

FIG. 16 is an enlarged cross sectional view of the circled B in FIG. 15;

DETAILED DESCRIPTION OF THE PREFERRED EMBODIMENT

Figure 1:
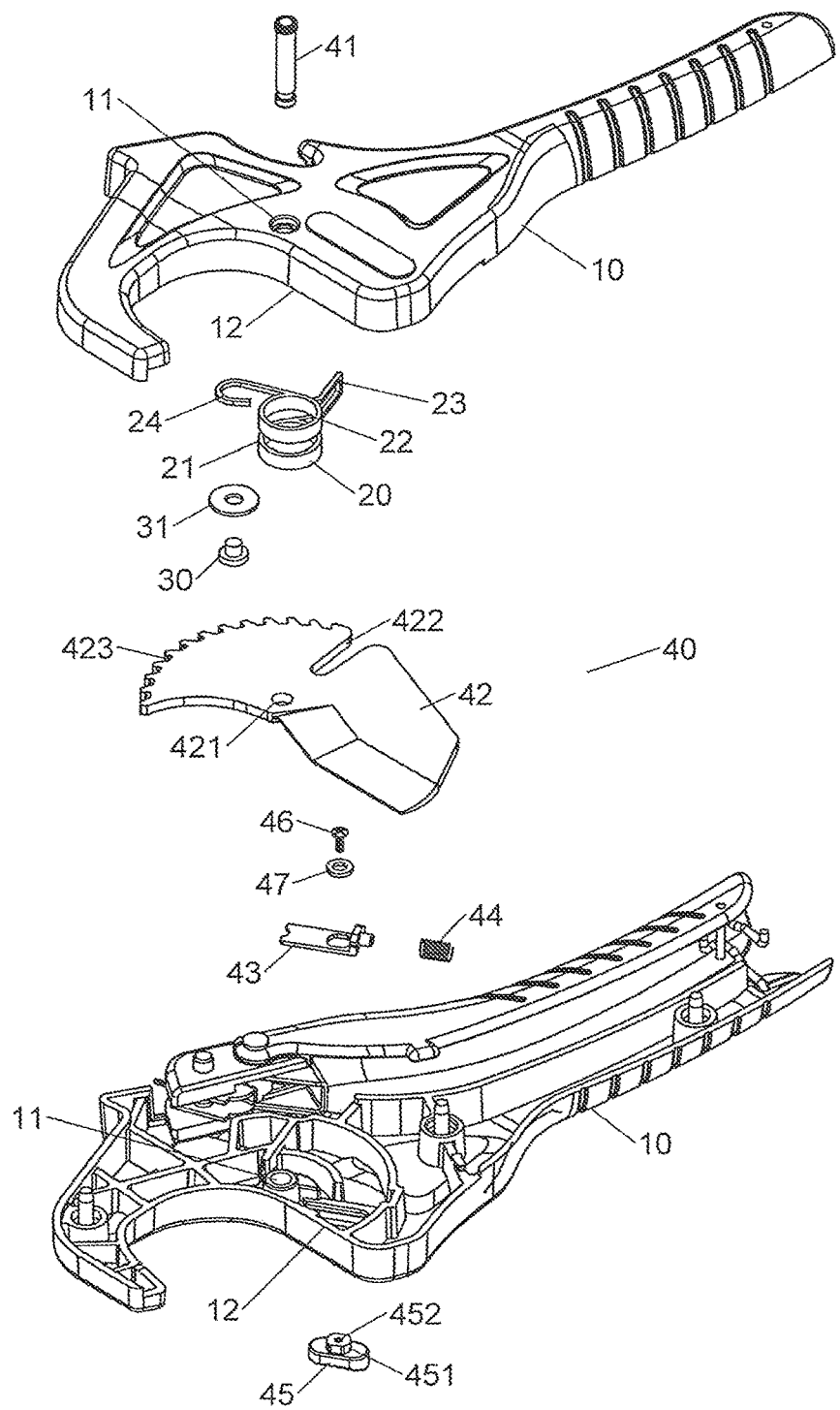
FIG. 1 is an exploded view of the pipe cutter of the present invention.
Figure 2:
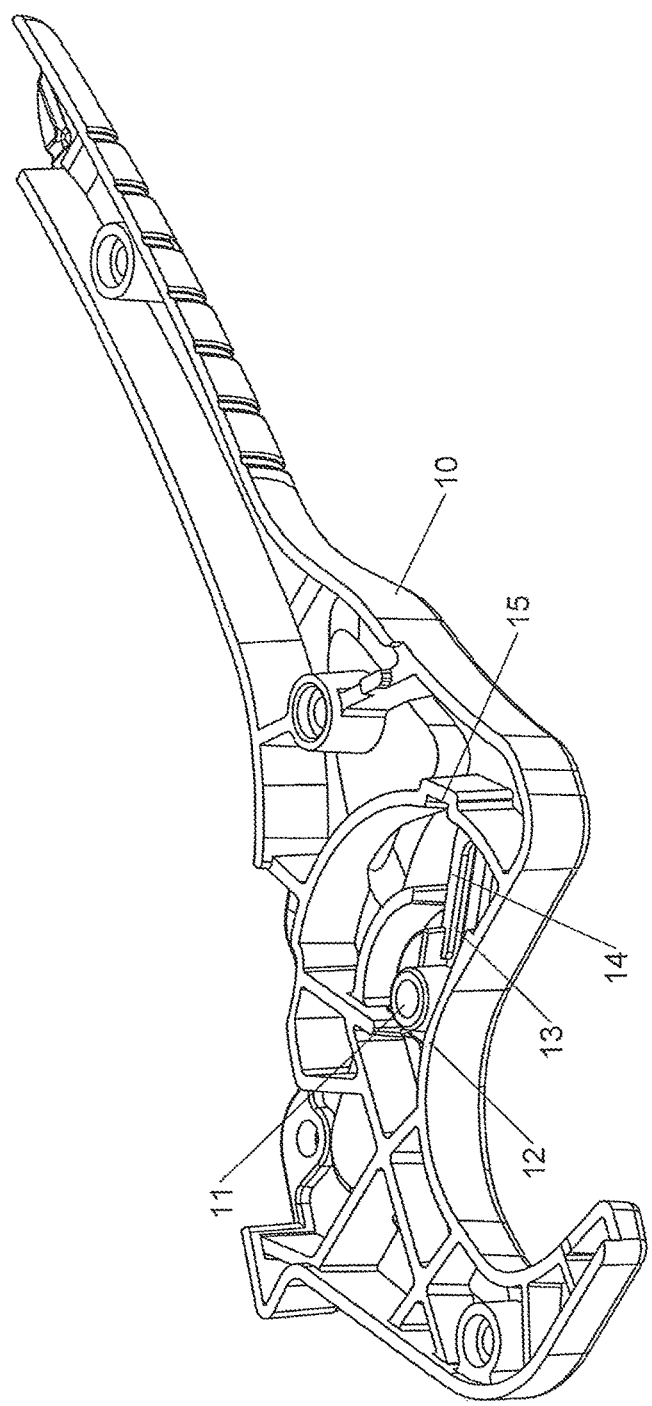
FIG. 2 is a perspective view to show the body of the pipe cutter of the present invention.
Figure 3:
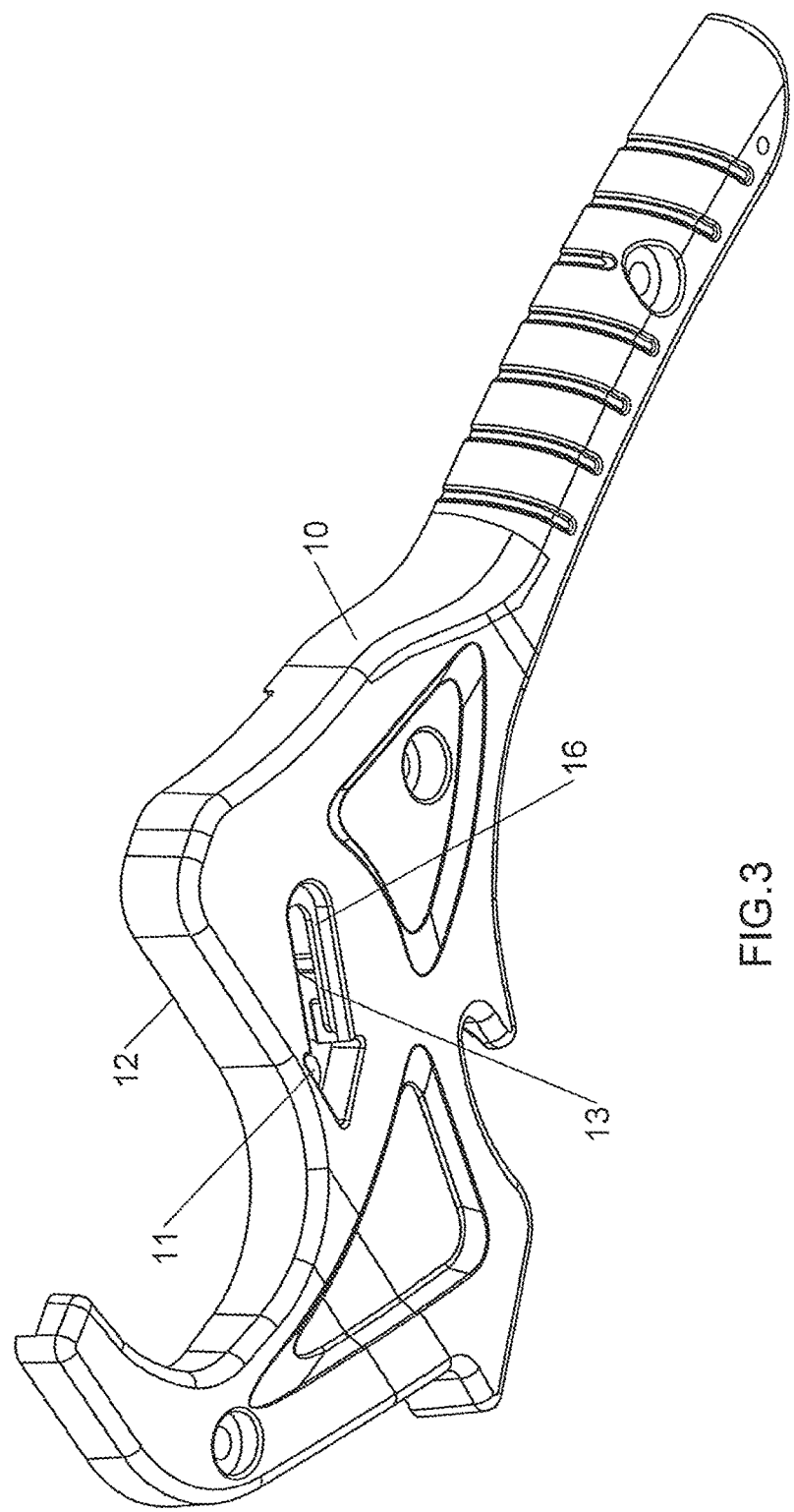
FIG. 3 is another perspective view to show the body of the pipe cutter of the present invention.
Figure 6:
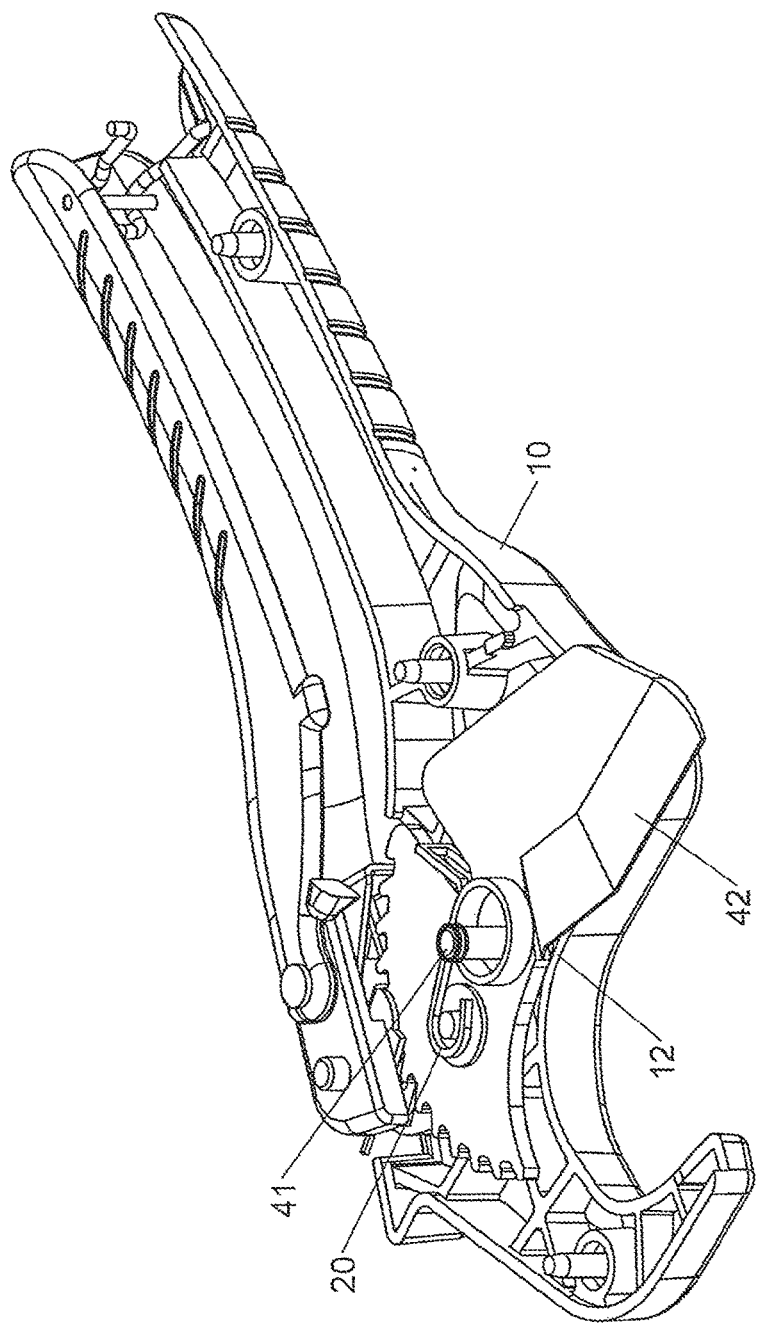
FIG. 6 shows the pipe cutter of the present invention, wherein a portion of the body is removed.
Figure 7:
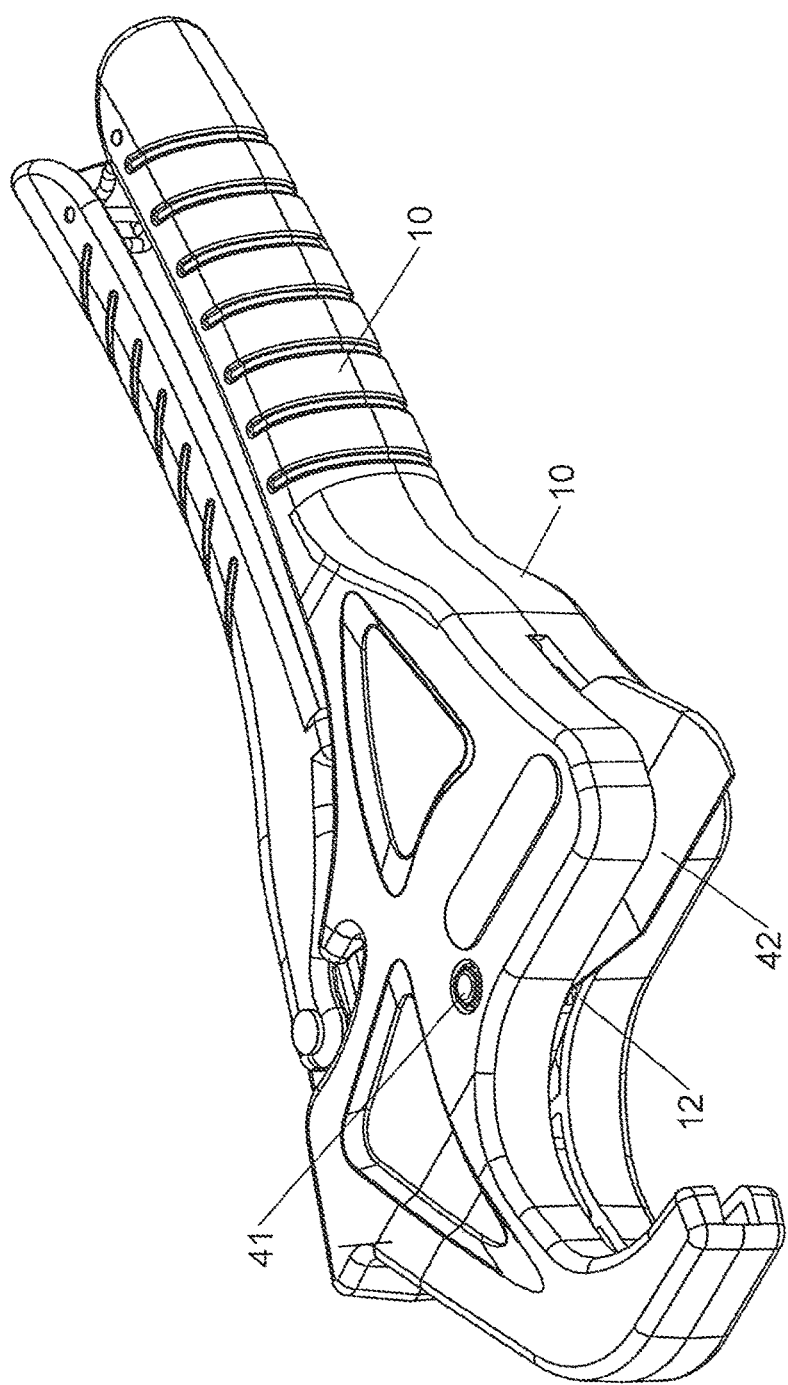
FIG. 7 is a perspective view to show the pipe cutter of the present invention.
Figure 8:
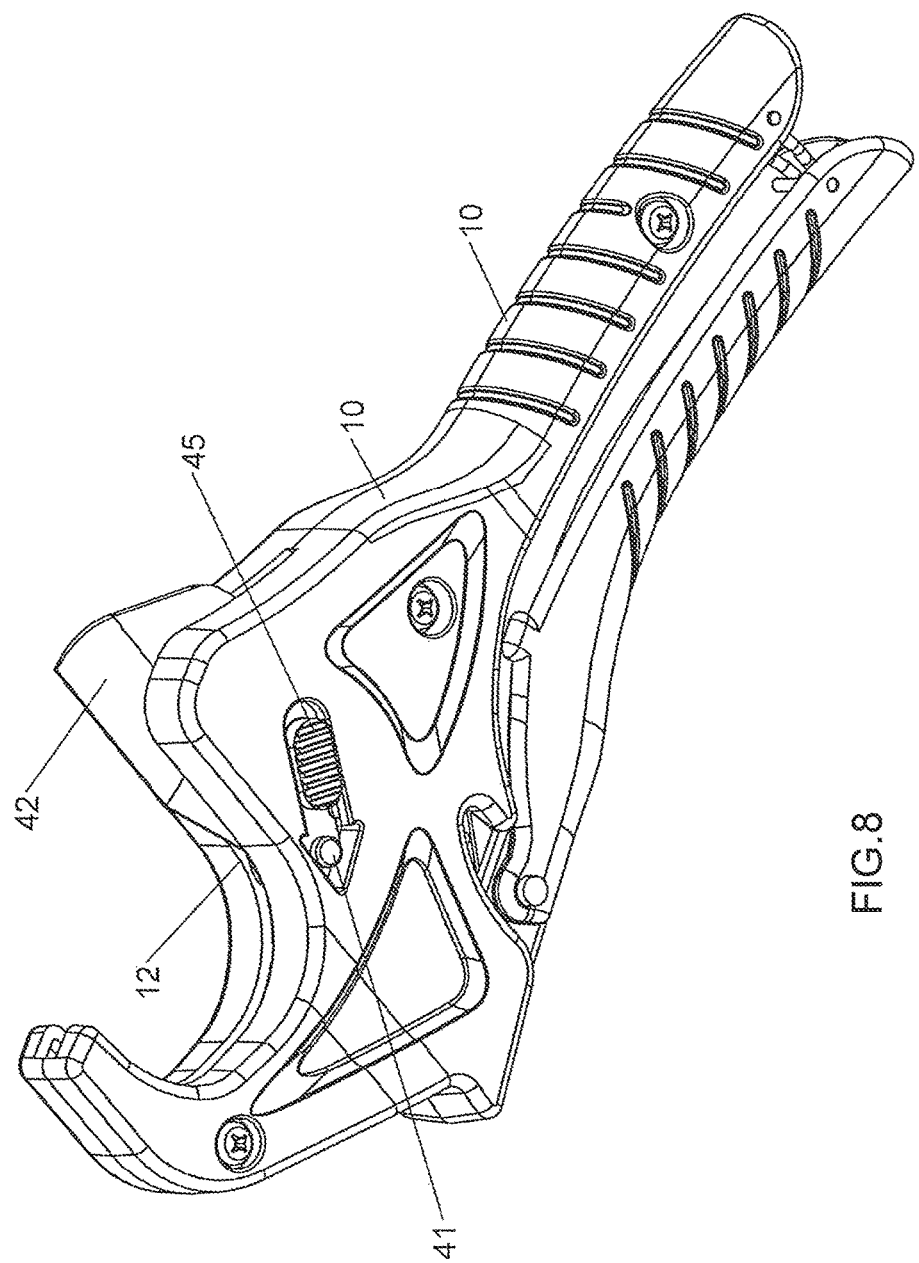
FIG. 8 is another perspective view to show the pipe cutter of the present invention.

Referring to FIGS. 1 to 6, the pipe cutter of the present invention comprises two bodies 10 connected to each other to form a first room 12. Each body 10 has a tubular member, and the tubular member has a passage 11 which communicates with the first room 12. The two passages 11 of the two bodies 10 are located corresponding to each other. One of the bodies 10 has a second room 13 which communicates with the passage 11 corresponding thereto. The second room 13 is a U-shaped room and communicates with the first room 12. A first face 14 and a second face 16 are respectively formed on two side of the second room 13. A reception recess 15 is defined at a position corresponding to one end of the second room 13. The second room 13 is located between the passage 11 and the reception recess 15. The reception recess 15 communicates with the first room 12. The first face 14 is located in the space between the two bodies 10, and the second face 16 is exposed from the body 10 corresponding thereto. Each of the first and second faces 14, 16 are a flat face.

A torsion spring 20 is located in the first room 12 and has a mounting member 22 which includes a radial opening 21 that is located corresponding to the first room 12. The mounting member 22 is mounted to the tubular members. The torsion spring 20 has a U-shaped first contact portion 23 on the first end thereof, and a first connection portion 24 on the second end thereof. The first connection portion 24 is a hook-shaped portion. A first connector 30 extends through a second connector 31 and the first connection portion 24 to secure the first connection portion 24 to one of the bodies 10. The first connector 30 is a bolt and the second connector 31 is a washer.

A blade unit 40 is connected to the bodies 10 and the torsion spring 20. The blade unit 40 comprises a pin 41, a blade 42, a movable member 43, a sprig 44, an action member 45, a third connector 46 and a ring-shaped fourth connector 47. The pin 41 extends through the passage 11 and the mounting member 22. The pin 41 has a groove 411 defined in the outside thereof, and a first engaging portion 412 is located on the first end of the pin 41 and close to the groove 411. A head 413 is located on the second end of the pin 41. The pin 41 is a circular cross section. The blade 42 is located in the first room 12 and the radial opening 21, and the blade 42 protrudes beyond the bodies 10 and has a pivotal hole 421 which is located corresponding to the passage 11. The pin 41 extends through passage 11, the mounting member 22 and the pivotal hole 421 so as to pivotably connect the blade 42 to the bodies 10. The pivotal hole 421 is located between the head 413 and the groove 411. The blade 42 has a U-shaped second contact portion 422 which contacts the first contact portion 23 so that the blade 42 is biased by the torsion spring 20. The second contact portion 422 is located close to the pivotal hole 421. The blade 42 has a toothed portion 423 formed along a curved edge thereof.

As shown in FIG. 5, the movable member 43 is linearly movable and received in the second room 13, and contacts the first face 14. The movable member 43 has a recessed and curved third contact portion 431 formed on the first end thereof, and the third contact portion 431 is engaged with the groove 411 and has a second engaging portion 432 which contacts the first engaging portion 412. A protrusion 433 extends from the second end of the movable member 43 and located corresponding to the reception recess 15. The movable member 43 has a non-circular hole 434 which is located close to the protrusion 433. The spring 44 is mounted to the protrusion 433 and biased between an inside of the reception recess 15 and the movable member 43. The pin 41 is restricted by the movable member 43 and is not disengaged from the passage 11. The spring 44 is a compression spring.

The action member 45 is linearly and movably received in the second room 13 and protrudes beyond the bodies 10. The action member 45 is co-movably connected to the movable member 43. The action member 45 contacts the second face 16. The action member 45 has an action portion 451 extending therefrom. The action portion 451 is shaped to be fitted in the hole 434. The action portion 451 has a second connection portion 452 which includes inner threads. The third connector 46 extends through the hole 434 and is connected to the second connection portion 452 to connect the movable member 43 with the action member 45. The third connector 46 has outer threads. The fourth connector 47 is mounted to the third connector 46 and presses on the movable member 43.

Figure 9:
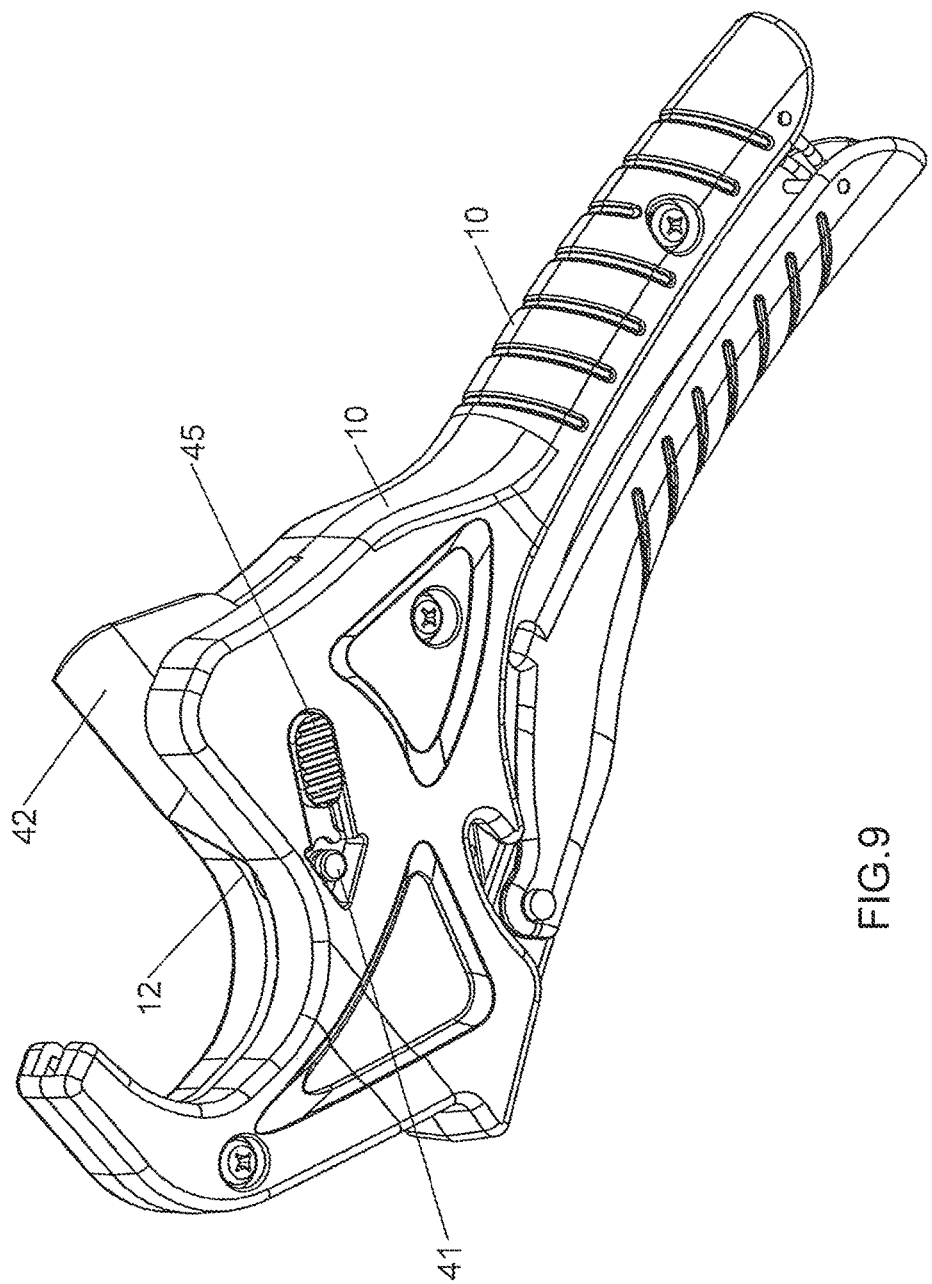
FIG. 9 shows the second operational status of the pipe cutter of the present invention.
Figure 10:
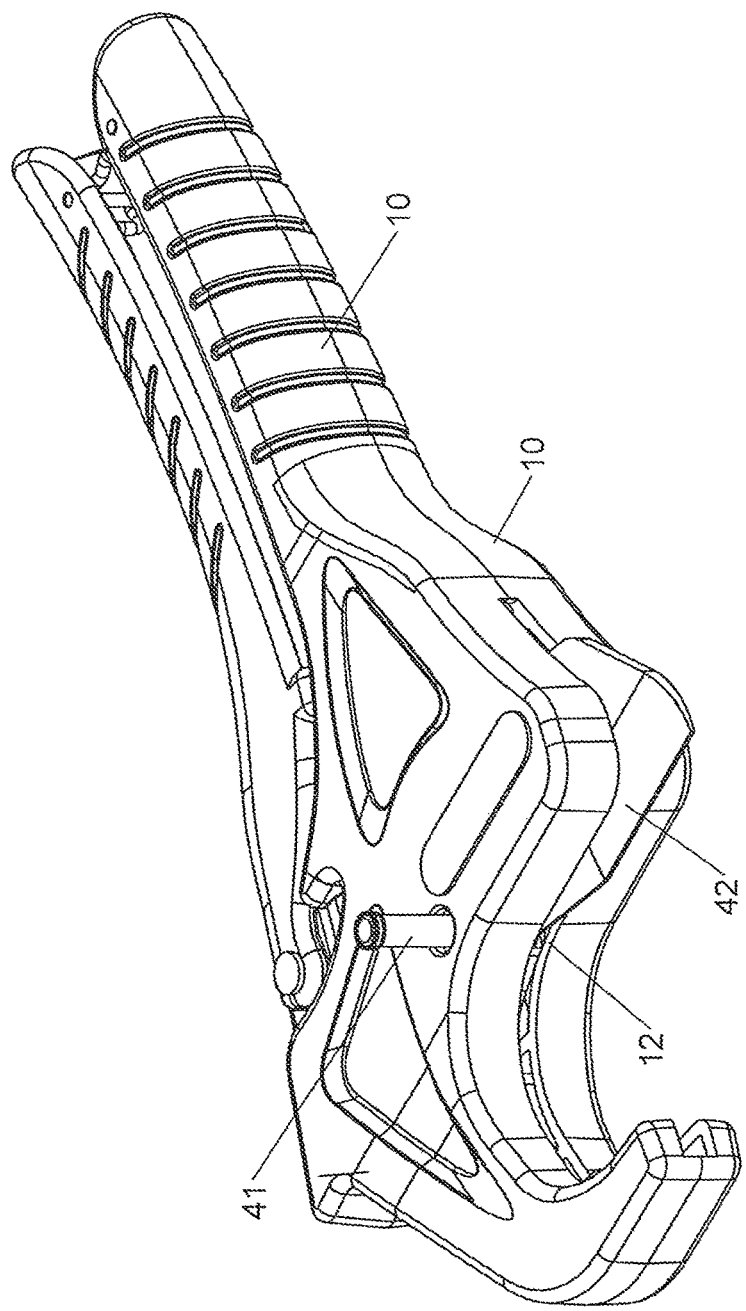
FIG. 10 shows another perspective view of the second operational status of the pipe cutter of the present invention.
Figure 11:
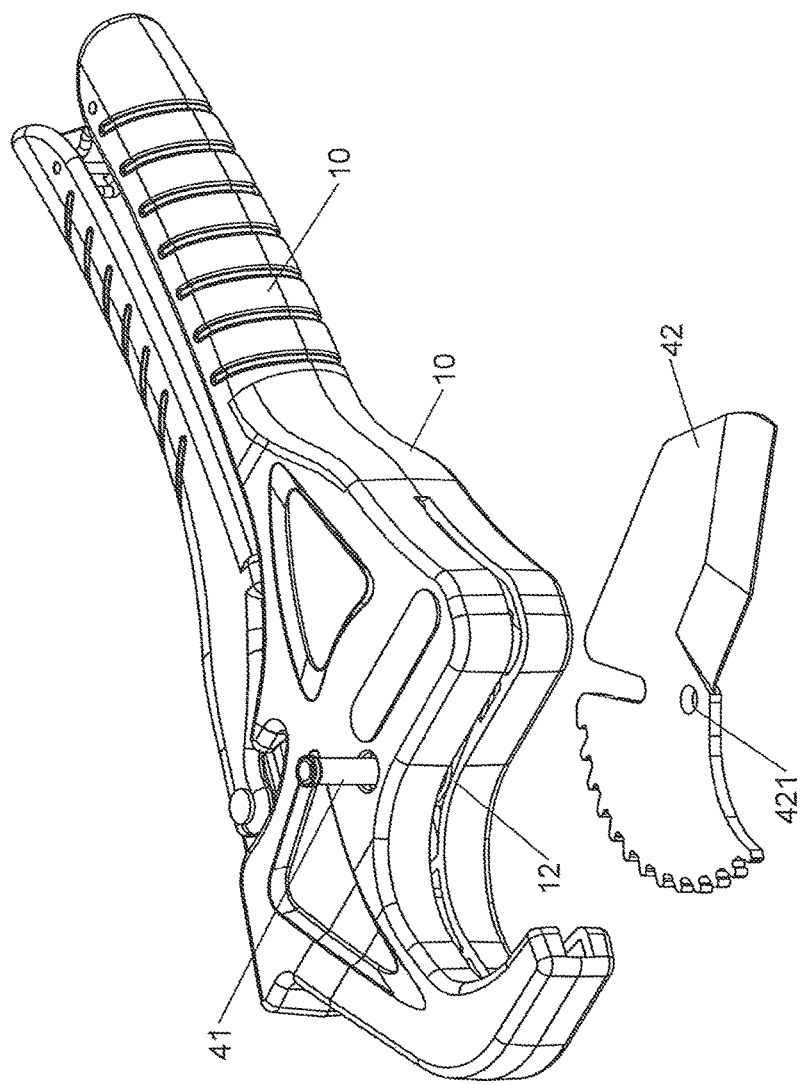
FIG. 11 shows the blade and the pipe cutter of the present invention.
Figure 12:
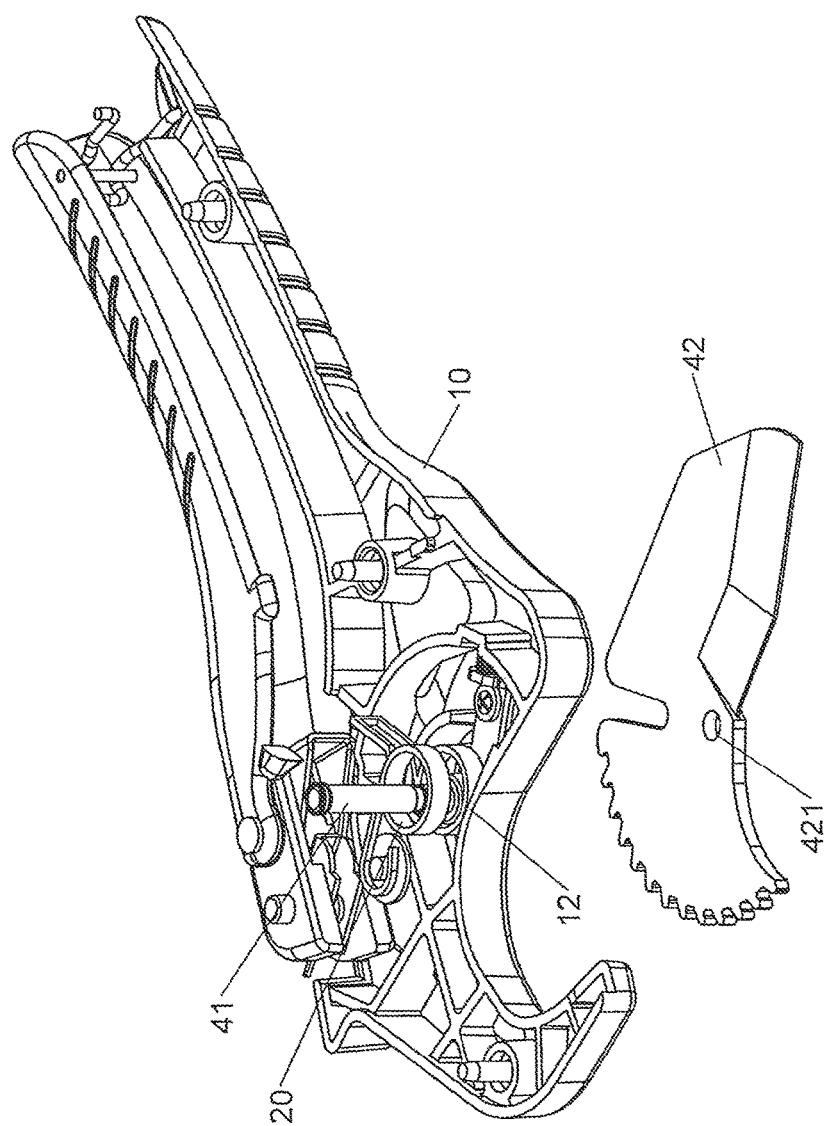
FIG. 12 shows the blade and the pipe cutter of the present invention, wherein a portion of the body is removed.

As shown in FIGS. 9 and 10, when the action member 45 is shifted, the movable member 43 is moved and compresses the spring 44, the third contact portion 431 and the second engaging portion 432 are respectively separated from the groove 411 and the first engaging portion 412, so that the pin 41 is not restricted by the movable member 43 and the pin 41 is able to be removed from the passage 11. As shown in FIGS. 11 and 12, after the pin 41 is moved a distance from the passage 11, the blade 42 is not restricted by the pin 41 and is removed from the bodies 10 so as to be replaced with another blade.

As shown in FIG. 12, the pin 41 is movable a distance in the passage 11 of the body 10, or the pin 41 is removed from the passage 11 of the body 10.

As shown in FIG. 13, the head 413 is an individual part and is connected to the second end of the pin 41. An end portion 414 is formed on the first end of the pin 41. The groove 411 is located between the head 413 and the end portion 414. The passage 11 includes a flange 113 extending from the inner periphery thereof and the inner diameter enclosed by the flange 113 is the first diameter 111. The passage 11 has a second diameter 112 which is larger than the first diameter 111. The third diameter 415 of the pin 41 is smaller than the fourth diameter 416 of the end portion 414. The third diameter 415 is equal to the first diameter 111. The passage 11 has a recess 114 at one end thereof and the head 413 is received in the recess 114.

When the pin 41 is not restricted by the movable member 43, the pin 41 moves within the passage 11, and the first engaging portion 412 on the end portion 414 is stopped by the flange 113 and cannot disengaged from the passage 11.

Figure 17:
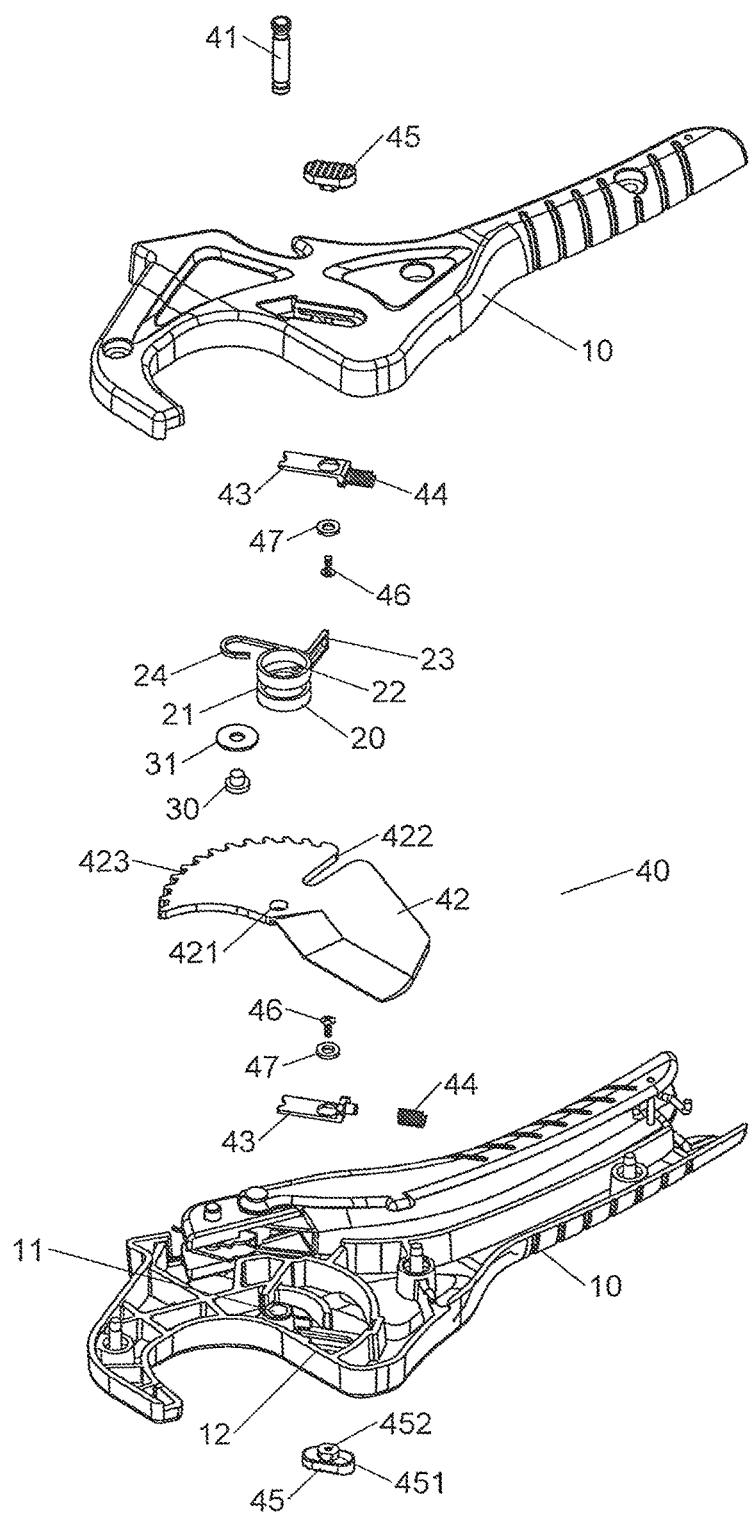
FIG. 17 is an exploded view of the third embodiment of the pipe cutter of the present invention.
Figure 18:
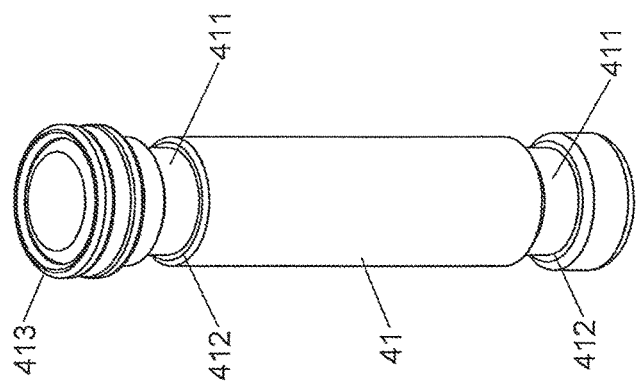
FIG. 18 is a perspective view to show the pin of the third embodiment of the pipe cutter of the present invention.
Figure 19:
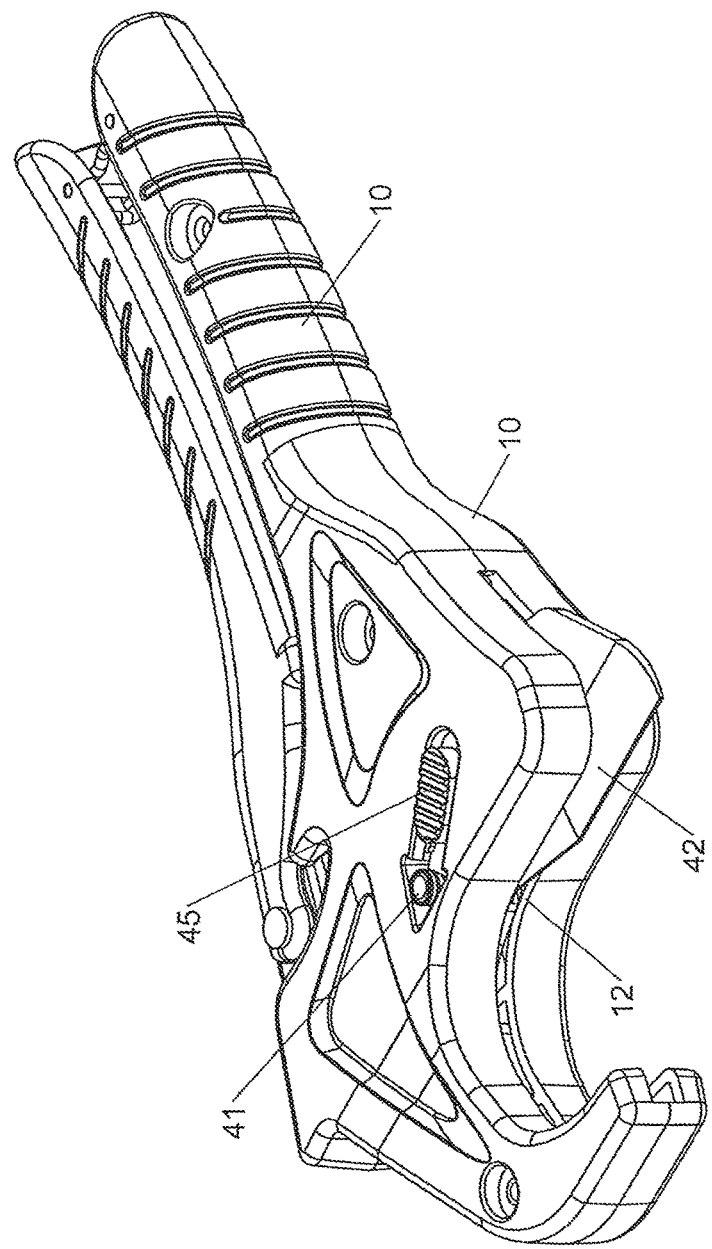
FIG. 19 is a perspective view to show the third embodiment of the pipe cutter of the present invention.

As shown in FIGS. 17 to 19, the two bodies 10 each have the second room 13, the first face 14, the reception recess 15 and the second face 16. The pin 41 has two grooves 411 and two first engaging portions 412. The second room 13 of each body 10 includes the movable member 43, the spring 44, the action member 45, the third connector 46 and the fourth connector 47. The third contact portion 431 and the second engaging portion 432 of each movable member 43 are respectively engaged with the groove 411 and the first engaging portion 412 of the pin 41 corresponding thereto. The pin 41 is not restricted by moving the two action members 45 and the two movable members 43. By the two action members 45, the pin 41 is not moved unintentionally.

As shown in FIG. 17, the two action members 45 are co-movable, so that the user can operate the action member 45 from either side of the pipe cutter.

The advantages of the present invention are that the pin 41 is restricted by the movable member 43 and is not disengaged from the passage 11. The blade 42 is restricted by the pin 41, and the pin 41 is restricted by the movable member 43 so that the blade 42 is secured.

When the action member 45 is shifted, the movable member 43 is moved and compresses the spring 44. The third contact portion 431 and the second engaging portion 432 are respectively separated from the groove 411 and the first engaging portion 412, so that the pin 41 is not restricted by the movable member 43 and the pin 41 is able to be removed from the passage 11. After the pin 41 is moved a distance from the passage 11, the blade 42 is not restricted by the pin 41 and is removed from the bodies 10 so as to be replaced with another blade.

As shown in FIG. 12, when installing the blade 42, the blade 42 is inserted into the first room 12 between the two bodies 10, when the second contact portion 422 slightly contacts the first contact portion 23, the pivotal hole 421 is located corresponding to the passage 11. The pin 41 extends through the pivotal hole 421 to install the blade 42.

As shown in FIG. 16, when the pin 41 is not restricted by the movable member 43, the user pulls the pin 41 toward the recess 114, because the fourth diameter 416 is larger than the first diameter 111, so that the end portion 414 is restricted by the flange 113 and cannot be completely removed from the passage 11. That is to say, the first engaging portion 412 contacts the flange 113 to prevent the pin 41 from dropping from the passage 11.

The advantages of the present invention are as followings:

1. safety: because the movable member 43 is linearly movable and received in the second room 13, and contacts the first face 14. The movable member 43 has a recessed and curved third contact portion 431 formed on the first end thereof, and the third contact portion 431 is engaged with the groove 411 and has a second engaging portion 432 which contacts the first engaging portion 412. A protrusion 433 extends from the second end of the movable member 43 and located corresponding to the reception recess 15. The movable member 43 has a non-circular hole 434 which is located close to the protrusion 433. The spring 44 is mounted to the protrusion 433 and biased between an inside of the reception recess 15 and the movable member 43. The pin 41 is restricted by the movable member 43 and is not disengaged from the passage 11;

2. convenience: when the action member 45 is shifted, the movable member 43 is moved and compresses the spring 44, the third contact portion 431 and the second engaging portion 432 are respectively separated from the groove 411 and the first engaging portion 412, so that the pin 41 is not restricted by the movable member 43 and the pin 41 is able to be removed from the passage 11. As shown in FIGS. 11 and 12, after the pin 41 is moved a distance from the passage 11, the blade 42 is not restricted by the pin 41 and is removed from the bodies 10 so as to be replaced with another blade;

3. another convenience: when installing the blade 42, the blade 42 is inserted into the first room 12 between the two bodies 10, when the second contact portion 422 slightly contacts the first contact portion 23, the pivotal hole 421 is located corresponding to the passage 11. The pin 41 extends through the pivotal hole 421 to install the blade 42, and 4. another safety: when the pin 41 is not restricted by the movable member 43, the user pulls the pin 41 toward the recess 114, because the fourth diameter 416 is larger than the first diameter 111, so that the end portion 414 is restricted by the flange 113 and cannot be completely removed from the passage 11. That is to say, the first engaging portion 412 contacts the flange 113 to prevent the pin 41 from dropping from the passage 11.

While we have shown and described the embodiment in accordance with the present invention, it should be clear to those skilled in the art that further embodiments may be made without departing from the scope of the present invention.

What is claimed is:

1. A pipe cutter comprising:
   two bodies connected to each other to form a first room, each body having a tubular member, the tubular member having a passage which communicates with the first room, one of the bodies having a second room which communicates with the passage corresponding thereto, the second room communicating with the first room, a first face and a second face respectively formed on two side of the second room, a reception recess defined at a position corresponding to one end of the second room, the second room located between the passage and the reception recess, the reception recess communicating with the first room, the second face being exposed from the body corresponding thereto;

a torsion spring located in the first room and having a mounting member which includes a radial opening that is located corresponding to the first room, the mounting member mounted to the tubular members, the torsion spring having a U-shaped first contact portion on a first end thereof;

a blade unit connected to the bodies and the torsion spring, the blade unit having a pin, a blade, a movable member, a spring, an action member, a third connector and a ring-shaped fourth connector, the pin extending through the passage and the mounting member, the pin having a groove defined in an outside thereof, and a first engaging portion located on a first end of the pin and close to the groove, a head located on a second end of the pin, the blade located in the first room and the radial opening, the blade protruding beyond the bodies and having a pivotal hole which is located corresponding to the passage, the pin extending through passage, the mounting member and the pivotal hole so as to pivotably connect the blade to the bodies, the pivotal hole located between the head and the groove, the blade having a U-shaped second contact portion contacts the first contact portion so that the blade is biased by the torsion spring, the second contact portion located close to the pivotal hole, the blade having a toothed portion formed along a curved edge thereof;

the movable member being movably received in the second room and contacting the first face, the movable member having a recessed and curved third contact portion formed on a first end thereof, the third contact portion engaged with the groove and having a second engaging portion which contacts the first engaging portion, a protrusion extending from a second end of the movable member and located corresponding to the reception recess, the movable member having a non-circular hole;

the spring mounted to the protrusion and biased between an inside of the reception recess and the movable member, the pin being restricted by the movable member and not being disengaged from the passage;

the action member being movably received in the second room and protruding beyond the bodies, the action member co-movably connected to the movable member, the action member contacting the second face, the action member having an action portion extending therefrom, the action portion being shaped to be fitted in the hole, the action portion having a second connection portion which includes inner threads;

the third connector extending through the hole and connected to the second connection portion to connect the movable member with the action member, the third connector having outer threads, and the fourth connector mounted to the third connector and pressing on the movable member, when the action member is shifted, the movable member is moved and compresses the spring, the third contact portion and the second engaging portion are respectively separated from the groove and the first engaging portion, so that the pin is not restricted by the movable member and the pin is able to be removed from the passage, the blade is not restricted by the pin and is removed from the bodies.

2. The pipe cutter as claimed in claim 1, wherein the second room is a U-shaped recess.

3. The pipe cutter as claimed in claim 1, wherein the spring is a compression spring.

4. The pipe cutter as claimed in claim 1, wherein the torsion spring has a first connection portion on a second end thereof, the first connection portion is a hook-shaped portion, a first connector extends through a second connector and the first connection portion to secure the first connection portion to one of the bodies, the first connector is a bolt and the second connector is a washer.

5. The pipe cutter as claimed in claim 1, wherein the movable member is linearly movable in the second room, the action member is linearly movable in the second room.

6. The pipe cutter as claimed in claim 1, wherein the pin is movable a distance in the passage of the body, or the pin is removed from the passage of the body.

7. The pipe cutter as claimed in claim 1, wherein the head is an individual part and connected to the second end of the pin, an end portion is formed on the first end of the pin, the groove is located between the head and the end portion, the passage includes a flange extending from an inner periphery thereof and an inner diameter enclosed by the flange is a first diameter, the passage has a second diameter which is larger than the first diameter, a third diameter of the pin is smaller than a fourth diameter of the end portion, the third diameter is equal to the first diameter, the passage has a recess at one end thereof and the head is received in the recess, when the pin is not restricted by the movable member, the pin moves within the passage, and the first engaging portion on the end portion is stopped by the flange and cannot disengaged from the passage.

8. The pipe cutter as claimed in claim 1, wherein the two bodies each have the second room, the first face, the reception recess and the second face, the pin has two grooves and two first engaging portions, the second room of each body includes the movable member, the spring, the action member, the third connector and the fourth connector, the third contact portion and the second engaging portion of each movable member are respectively engaged with the groove and the first engaging portion of the pin corresponding thereto, the pin is not restricted by moving the two action members and the two movable members.

9. The pipe cutter as claimed in claim 8, wherein the two action members are co-movable.

* * * * *